(12) United States Patent
Jung

(10) Patent No.: US 11,493,103 B2
(45) Date of Patent: Nov. 8, 2022

(54) ELECTRIC BRAKE APPARATUS OF VEHICLE

(71) Applicant: HYUNDAI MOBIS CO., LTD., Seoul (KR)

(72) Inventor: Ha Min Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 96 days.

(21) Appl. No.: 17/060,897

(22) Filed: Oct. 1, 2020

(65) Prior Publication Data
US 2021/0102588 A1 Apr. 8, 2021

(30) Foreign Application Priority Data
Oct. 8, 2019 (KR) .................. 10-2019-0124503

(51) Int. Cl.
*F16D 65/18* (2006.01)
*F16D 55/226* (2006.01)
(Continued)

(52) U.S. Cl.
CPC .......... *F16D 65/18* (2013.01); *F16D 55/2262* (2013.01); *F16D 65/0068* (2013.01);
(Continued)

(58) Field of Classification Search
CPC ................ F16D 65/18; F16D 55/2262; F16D 2055/0016; F16D 65/092; F16D 65/0068;
(Continued)

(56) References Cited

U.S. PATENT DOCUMENTS 5,348,123 A * 9/1994 Takahashi ............. B60T 13/745
188/162
5,915,504 A 6/1999 Doricht
(Continued)

FOREIGN PATENT DOCUMENTS

KR 10-2018-0125240 A 11/2018
WO 2010/060725 A1 6/2010

OTHER PUBLICATIONS

Translation of WO document No. 2010/060725 obtained from website: https://worldwide.espacenet.com on Mar. 2, 2022.*
(Continued)

*Primary Examiner* — Pamela Rodriguez
(74) *Attorney, Agent, or Firm* — Morgan, Lewis & Bockius LLP

(57) ABSTRACT

An electric brake apparatus of a vehicle includes a caliper body formed with a cylinder section and a boost force support section disposed to face the cylinder section with a brake disc interposed therebetween; an internal motor installed in the cylinder section, and generating a rotational displacement by application of current; a push rod disposed coaxially with the internal motor; a ball-in-ramp disposed between the internal motor and the push rod, converting the rotation displacement of the internal motor into a linear displacement, and transferring the linear displacement to the push rod; a piston disposed in an open part of the cylinder section, pushed and moved by the push rod; a first friction pad coupled to the piston, and disposed on one side of the brake disc; and a second friction pad coupled to the boost force support section, and disposed on the other side of the brake disc.

11 Claims, 5 Drawing Sheets

(51) Int. Cl.
*F16D 65/00* (2006.01)
*F16D 65/092* (2006.01)
*F16D 125/36* (2012.01)
*F16D 121/24* (2012.01)
*F16D 121/20* (2012.01)
*F16D 125/70* (2012.01)
*F16D 55/00* (2006.01)

(52) U.S. Cl.
CPC .... *F16D 65/092* (2013.01); *F16D 2055/0016* (2013.01); *F16D 2121/20* (2013.01); *F16D 2121/24* (2013.01); *F16D 2125/36* (2013.01); *F16D 2125/70* (2013.01)

(58) Field of Classification Search
CPC ............. F16D 2125/36; F16D 2121/24; F16D 2121/20; F16D 2125/70
See application file for complete search history.

(56) References Cited

U.S. PATENT DOCUMENTS

| | | | | |
|---|---|---|---|---|
| 6,142,265 | A | * | 11/2000 | Reimann ................. F16D 65/18 188/162 |
| 6,279,691 | B1 | * | 8/2001 | Takahashi ............. F16D 65/567 188/71.9 |
| 7,950,503 | B2 | * | 5/2011 | Shigeta .................. F16D 65/18 188/71.9 |
| 2014/0020989 | A1 | | 1/2014 | Hong et al. |
| 2021/0301892 | A1 | * | 9/2021 | Gerber .................... F16D 55/22 |

OTHER PUBLICATIONS

Office Action issued in corresponding Chinese Patent Application No. 202011054313.7 dated Jan. 19, 2022.

* cited by examiner

SECTION A-A'

ELECTRIC BRAKE APPARATUS OF VEHICLE

CROSS-REFERENCE TO RELATED APPLICATION

This application claims priority from and the benefit of Korean Patent Application No. 10-2019-0124503, filed on Oct. 8, 2019, which is hereby incorporated by reference for all purposes as if set forth herein.

BACKGROUND

Field

Exemplary embodiments of the present disclosure relate to an electric brake apparatus of a vehicle, and more particularly, to an electric brake apparatus of a vehicle, which generates a boost force for braking a vehicle.

Discussion of the Background

In general, an electric brake for a vehicle which uses a caliper, such as an EMB (electro-mechanical brake) and an EPB (electric parking brake), has a structure including an actuator which generates a rotational force, a gear device for decelerating the output of the actuator to a target speed, a screw device which converts a rotational displacement of the gear device into a linear displacement, and a piston which is moved by receiving the linear displacement of the screw device and presses pads against a brake disc.

Such a conventional electric brake for a vehicle has a complex construction in which separate three housings corresponding to the actuator and an actuator housing covering the actuator, the gear device and a gear housing covering the gear device, and a caliper body accommodating the screw device and the piston are coupled to one another. Accordingly, a problem may be caused in that assemblability and price competitiveness deteriorate. Therefore, there is a need to solve such a problem.

A background art of the present disclosure is disclosed in Korean Patent Laid-Open Publication No. 10-2018-0125240 (published on Nov. 23, 2018 and entitled "Electrical Parking Brake").

SUMMARY

Various embodiments are directed to an electric brake apparatus of a vehicle capable of realizing miniaturization and weight reduction, by simplification of a structure, and achieving ease of manufacture and cost reduction.

In an embodiment, an electric brake apparatus of a vehicle may include: a caliper body formed with a cylinder section and a boost force support section which is disposed to face the cylinder section with a brake disc interposed therebetween; an internal motor installed in the cylinder section, and generating a rotational displacement by application of current; a push rod disposed coaxially with the internal motor; a ball-in-ramp disposed between the internal motor and the push rod, converting the rotation displacement of the internal motor into a linear displacement, and transferring the linear displacement to the push rod; a piston disposed in an open part of the cylinder section, and pushed and moved by the push rod; a first friction pad coupled to the piston, and disposed on one side of the brake disc; and a second friction pad coupled to the boost force support section, and disposed on the other side of the brake disc.

The internal motor may include: a stator section fixedly installed to the cylinder section; and a rotor section rotatably installed to the cylinder section, facing the push rod with the ball-in-ramp interposed therebetween, and rotated by an electromagnetic field formed between the rotor section and the stator section.

The rotor section may include: a rotor body part having a cylindrical shape, and disposed radially inward of the stator section; a rotor open part formed to be open at one end of the rotor body part, and forming a passage through which the push rod is introduced into the rotor body part; a torque transfer part formed to close the other end of the rotor body part, and facing the push rod with the ball-in-ramp interposed therebetween; and a rotation shaft part formed at a rotational center portion of the torque transfer part, and rotatably installed to the cylinder section.

The ball-in-ramp may include: a first ball-guide inclined section formed in one of the rotor section and the push rod; a second ball-guide inclined section formed in the other of the rotor section and the push rod, and disposed to face the first ball-guide inclined section; and a pressing ball disposed between the first ball-guide inclined section and the second ball-guide inclined section, and pressing the push rod in an axial direction while rolling in conjunction with rotation of the rotor section.

The first ball-guide inclined section may include: a first ball-guide groove part formed to be recessed in a circular or arc shape at one side of the rotor section which faces the push rod, and having one part of the pressing ball introduced therein; and a first circumferential inclined part forming an inclined surface which continues in an extending direction of the first ball-guide groove part, to allow the pressing ball to have an axial displacement while being moved along the first ball-guide groove part.

The second ball-guide inclined section may include: a second ball-guide groove part formed to be recessed in a circular or arc shape at one side of the push rod which faces the rotor section, and having the other part of the pressing ball introduced therein; and a second circumferential inclined part forming an inclined surface which continues in an extending direction of the second ball-guide groove part, to allow the pressing ball to have an axial displacement while being moved along the second ball-guide groove part.

The push rod may have a linear displacement corresponding to a sum of a first linear displacement in the axial direction while the pressing ball is moved along the first circumferential inclined part when the rotor section is rotated and a second linear displacement in the axial direction while the pressing ball is moved along the second circumferential inclined part when the rotor section is rotated.

The electric brake apparatus may further include: a boot seal made of an elastic material, installed in the cylinder section, and having an inner diameter part which is in contact with the piston.

The boot seal may include: a cylinder installation section coupled to the cylinder section; and a piston pressing section formed to project into the cylinder section, being in contact with the piston, and elastically pressing the piston toward the push rod.

The electric brake apparatus may further include: an electronic control unit including a sensor which senses a rotational displacement of the internal motor, and controlling driving of the internal motor.

The sensor may include: a magnet part including a permanent magnet, and coupled to the internal motor; and a magnet sensing part installed on a circuit board of the electronic control unit, and sensing a change in an electromagnetic field formed between the magnet part and the magnet sensing part when the internal motor is rotated.

The caliper body may further include: a control unit installation section disposed to be aligned with the cylinder section in the axial direction, and having the electronic control unit accommodated therein.

The electric brake apparatus of a vehicle according to the embodiments of the present disclosure may realize a boost force generation and transfer structure in which an internal motor generating a rotational displacement, a ball-in-ramp converting the rotational displacement of the internal motor into a linear displacement and a push rod pushing a piston are axially and radially disposed in a cylinder section of a caliper body.

Therefore, according to the embodiments of the present disclosure, when compared to the conventional art in which casings for respectively accommodating an actuator generating a rotational force, a gear device for decelerating the output of the actuator and a screw device converting the rotational displacement of the gear device into a linear displacement should be separately provided, the caliper body may perform a function that substantially incorporates the functions of the casing of the actuator and the casing of the gear device.

Also, according to the embodiments of the present disclosure, the conventional complex structure including a bolt screw and a nut screw may be avoided by simplifying and applying the conventional complex structure as a component corresponding to the push rod which has only a linear displacement.

Consequently, according to the embodiments of the present disclosure, it is possible to not only realize miniaturization and weight reduction, by simplification of a structure, but also achieve ease of manufacture and cost reduction.

DETAILED DESCRIPTION OF THE ILLUSTRATED EMBODIMENTS

Hereinafter, an electric brake apparatus of a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
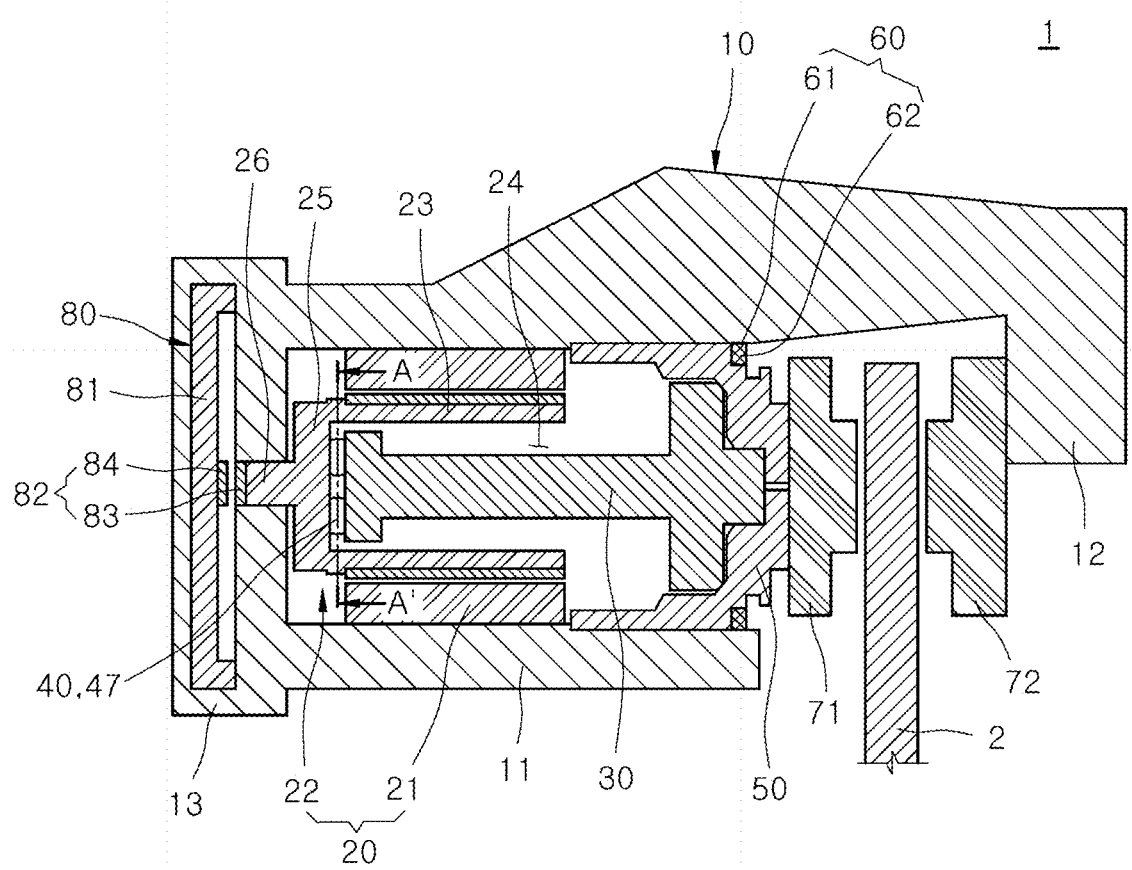
FIG. 1 is a conceptual view schematically illustrating an electric brake apparatus of a vehicle in accordance with an embodiment of the present disclosure.

FIG. 1 is a conceptual view schematically illustrating an electric brake apparatus of a vehicle in accordance with an embodiment of the present disclosure.

Referring to FIG. 1, the electric brake apparatus 1 of a vehicle in accordance with the embodiment of the present disclosure includes a caliper body 10, an internal motor 20, a push rod 30, a ball-in-ramp 40, a piston 50, a first friction pad 71, a second friction pad 72, a boot seal 60, and an electronic control unit 80.

The caliper body 10 is a device unit which functions as a support frame capable of supporting the first friction pad 71, the second friction pad 72, the boot seal 60 and the electronic control unit 80 at preset positions and functions as a casing capable of protecting the components from the external environment. The caliper body 10 in accordance with the embodiment of the present disclosure includes a cylinder section 11, a boost force support section 12, and a control unit installation section 13.

The cylinder section 11 has a cylinder structure capable of accommodating therein the internal motor 20, the push rod 30, the ball-in-ramp 40 and the piston 50. The boost force support section 12 is formed at one end (a right end in FIG. 1) of the cylinder section 11 to extend in an 'L'-shape, and an end of the boost force support section 12 faces an open part of the cylinder section 11. The cylinder section 11 and the boost force support section 12 are disposed to face each other with a brake disc 2 interposed therebetween.

The control unit installation section 13, as a device section in which the electronic control unit 80 is accommodated, has a 'U' cross-sectional shape and is disposed to be aligned with the other end (a left end in FIG. 1) of the cylinder section 11 in an axial direction. The axial direction means a movement direction of the push rod 30 and the piston 50, and is a left-and-right direction in FIG. 1. Hereinafter, when describing positions and directions of components in accordance with the embodiment of the present disclosure, a left-and-right direction and an up-and-down direction will be described based on the illustration of FIG. 1.

A portion of the cylinder section 11 to which a rotation shaft part 26 of the internal motor 20 is coupled is formed to be passed through by the rotation shaft part 26 in the axial direction. Due to this fact, an end of the rotation shaft part 26 is exposed to the control unit installation section 13 which is positioned outside the cylinder section 11. By sensing the rotation of the exposed end of the rotation shaft part 26, information on a rotational displacement and an operating state of the internal motor 20 disposed inside the cylinder section 11 may be sensed in real time at the control unit installation section 13.

The internal motor 20 is installed inside the cylinder section 11, and realizes the operation of a motor which generates a rotational displacement by the application of current. The internal motor 20 in accordance with the embodiment of the present disclosure includes a stator section 21 and a rotor section 22.

The stator section 21 is fixedly installed to an inner diameter part of the cylinder section 11. The stator section 21 is disposed in a circular shape along the inner diameter part of the cylinder section 11, and is formed to extend in the axial direction of the cylinder section 11. The rotor section 22 is disposed radially inward of the stator section 21, and is rotatably installed to the cylinder section 11.

The rotor section 22 faces the push rod 30 with the ball-in-ramp 40 interposed therebetween, and is rotated by an electromagnetic field formed between the rotor section 22 and the stator section 21. A coil to which current is applied is installed on one of the stator section 21 and the rotor section 22, and a permanent magnet is installed on the other. The rotor section 22 is rotated by an electromagnetic force formed between the coil and the permanent magnet as current is applied to the coil.

The internal motor 20 generates a rotational force that rotates the rotor section 22, by the electromagnetic action between the stator section 21 and the rotor section 22 described above. The rotor section 22 in accordance with the embodiment of the present disclosure includes a rotor body part 23, a rotor open part 24, a torque transfer part 25, and the rotation shaft part 26.

The rotor body part 23, as a device part which forms a basic frame of the rotor section 22 outputting a rotational force, has a cylindrical shape with a hollow inside, and is disposed radially inward of the stator section 21. The coil or the permanent magnet is installed on the rotor body part 23.

The rotor open part 24 is formed to be open at a right end of the rotor body part 23 which faces the open part of the cylinder section 11. A left section of the push rod 30 extends into the rotor body part 23 through the rotor open part 24.

The torque transfer part 25, as a device part which transfers a rotational force of the rotor body part 23 to the push rod 30, is formed to close a left end of the rotor body part 23. The torque transfer part 25 has a circular plate shape, and faces a left end of the push rod 30 with the ball-in-ramp 40 interposed therebetween. A first ball-guide inclined section 41 of the ball-in-ramp 40 is formed in the torque transfer part 25.

The rotation shaft part 26, as a device part which forms a rotation shaft of the rotor section 22, is formed at a rotational center portion of the torque transfer part 25 to project leftward, and is rotatably installed through the closed left end of the cylinder section 11. The rotation shaft part 26 may be rotatably supported by a bearing or the like. A left end of the rotation shaft part 26 is formed to pass through the cylinder section 11, and is exposed to a space on a left side of the cylinder section 11 through a hole supporting the rotation shaft part 26, that is, a space inside the control unit installation section 13.

The push rod 30 has a rod shape which extends in the left-and-right direction, and is disposed on the same axis as the rotor section 22 of the internal motor 20. The left section of the push rod 30 is introduced into the rotor section 22 through the rotor open part 24 of the rotor section 22, and a right section of the push rod 30 is disposed to extend outward of the rotor section 22.

The left end of the push rod 30 which faces the torque transfer part 25 of the rotor section 22 has a circular plate shape so that the application of the ball-in-ramp 40 may be stably carried out. A second ball-guide inclined section 44 of the ball-in-ramp 40 is formed in the left end of the push rod 30.

Figure 2:
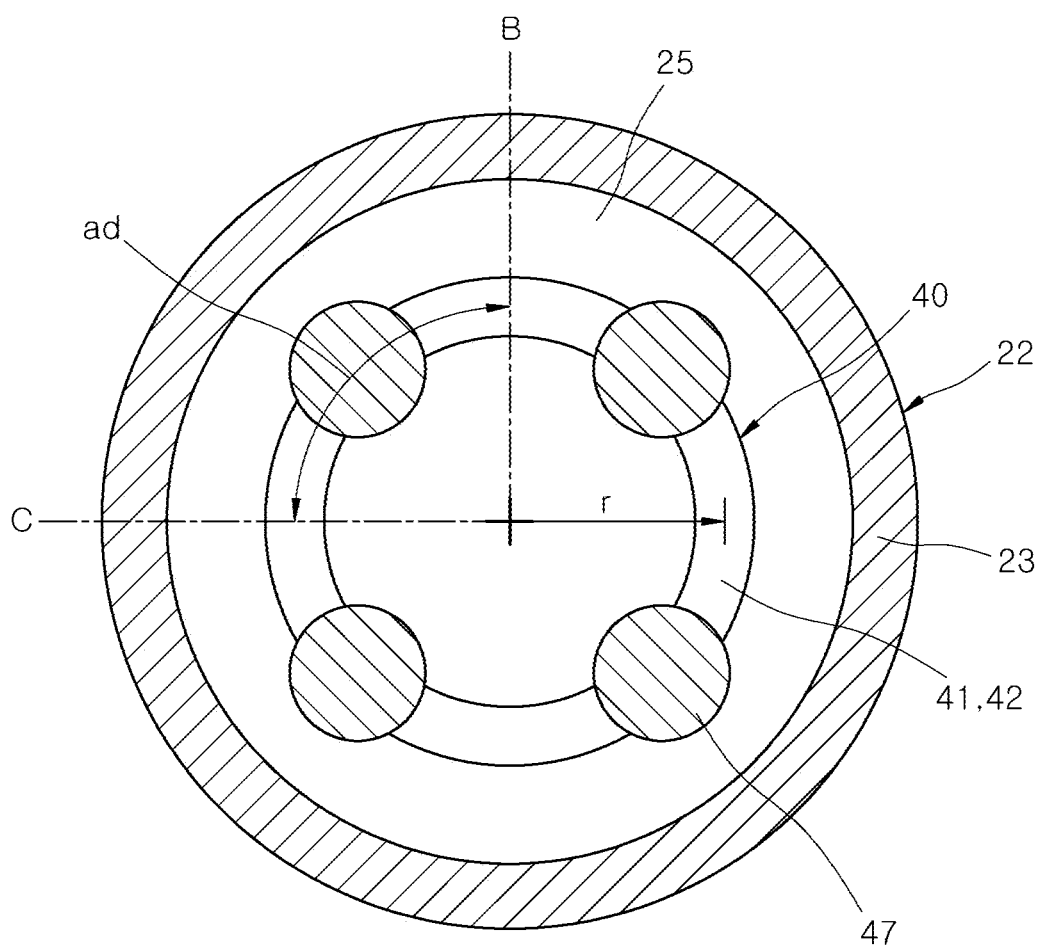
FIG. 2 is a cross-sectional view taken along the line A-A' of FIG. 1.
Figure 3:
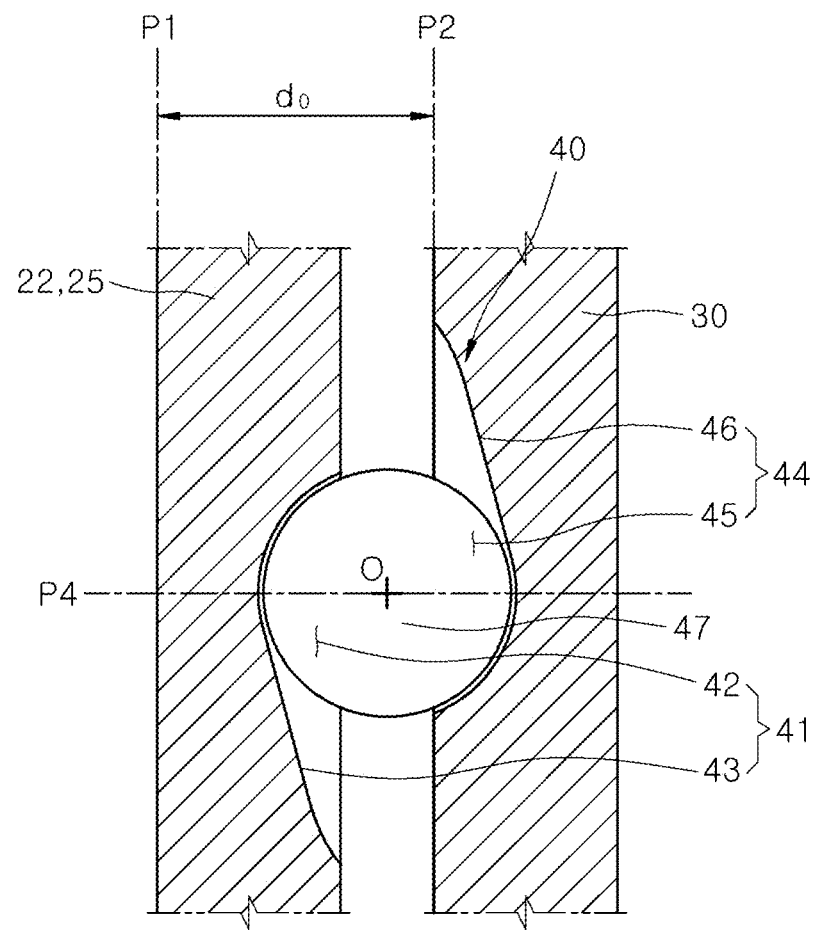
FIG. 3 is a conceptual view to assist in the explanation of an operation principle of a ball-in-ramp of the electric brake apparatus of a vehicle in accordance with the embodiment of the present disclosure.

FIG. 2 is a cross-sectional view taken along the line A-A' of FIG. 1, and FIG. 3 is a conceptual view to assist in the explanation of an operation principle of the ball-in-ramp of the electric brake apparatus of a vehicle in accordance with the embodiment of the present disclosure. FIG. 3 is a longitudinal cross-sectional view of the ball-in-ramp 40 illustrating an arc-shaped line 'ad,' positioned through a section B-C of FIG. 2, in a straightened state.

The ball-in-ramp 40, as a device unit which converts a rotational displacement of the internal motor 20 into a linear displacement 'd' and transfers the linear displacement 'd' to the push rod 30, is disposed between the internal motor 20 and the push rod 30. Referring to FIGS. 1 to 3, the ball-in-ramp 40 in accordance with the embodiment of the present disclosure includes the first ball-guide inclined section 41, the second ball-guide inclined section 44, and a pressing ball 47.

The first ball-guide inclined section 41 is formed to be recessed in the torque transfer part 25 of the rotor section 22, and has a structure in which a recession depth changes, more specifically, becomes gradually deep or shallow, depending on a circumferential position. The first ball-guide inclined section 41 in accordance with the embodiment of the present disclosure includes a first ball-guide groove part 42 and a first circumferential inclined part 43.

The first ball-guide groove part 42 is formed to be recessed in a circular or arc shape at a right end of the torque transfer part 25 of the rotor section 22, which faces the push rod 30. As illustrated in FIG. 2, the first ball-guide groove part 42 is formed to extend in a circular or arc shape with a predetermined radius 'r' with respect to a rotation center of the torque transfer part 25. One part of the pressing ball 47 (a left part of the pressing ball 47 in FIGS. 1 and 3) is introduced into the first ball-guide groove part 42.

The first circumferential inclined part 43 forms an inclined surface which continues in an extending direction of the first ball-guide groove part 42, to allow the pressing ball 47 to have an axial displacement while being moved in a circumferential direction along the first ball-guide groove part 42. FIG. 3 illustrates an arc-shaped line 'ad', positioned through the section B-C of FIG. 2, in a straightened state. The first circumferential inclined part 43 has an inclined shape whose recession depth becomes gradually shallow toward one end, that is, whose recession depth becomes gradually deep toward the other end, within a preset section (for example, the section B-C) illustrated in FIG. 3.

A plurality of first circumferential inclined parts 43 corresponding to the number of pressing balls 47 may be disposed on to be continuous to first ball-guide groove parts 42 or to be spaced part by a predetermined interval from the first ball-guide groove parts 42. For example, in the case where four pressing balls 47 are disposed, four first circumferential inclined parts 43 to be in contact with the four pressing balls 47, respectively, are formed to be continuous to the first ball-guide groove parts 42.

The second ball-guide inclined section 44 is formed to be recessed on the left end of the push rod 30, and is disposed to face the first ball-guide inclined section 41. Like the first ball-guide inclined section 41, the second ball-guide inclined section 44 has a structure in which a recession depth changes, more specifically, becomes gradually deep or shallow, depending on a circumferential position. The second ball-guide inclined section 44 in accordance with the embodiment of the present disclosure includes a second ball-guide groove part 45 and a second circumferential inclined part 46.

The second ball-guide groove part 45 is formed to be recessed in a circular or arc shape corresponding to the first ball-guide groove part 42 on the left end of the push rod 30, which faces the rotor section 22. Like the first ball-guide groove part 42, the second ball-guide groove part 45 is formed to extend in a circular or arc shape having a predetermined radius 'r.' The other part of the pressing ball 47 (a right part of the pressing ball 47 in FIGS. 2 and 3) is introduced into the second ball-guide groove part 45.

The second circumferential inclined part 46 forms an inclined surface which continues in an extending direction of the second ball-guide groove part 45, to allow the pressing ball 47 to have an axial displacement while being moved along the second ball-guide groove part 45. The second circumferential inclined part 46 is disposed to face the first circumferential inclined part 43, but has an inclined shape opposite to that of the first circumferential inclined part 43.

When the first circumferential inclined part 43 has an inclined shape whose recession depth becomes gradually deep toward one end within the preset section (for example, the section B-C) illustrated in FIG. 3, the second circumferential inclined part 46 has an inclined shape whose recession depth becomes gradually shallow toward the one end, that is, an inclined shape whose recession depth becomes gradually deep toward the other end.

Figure 4:
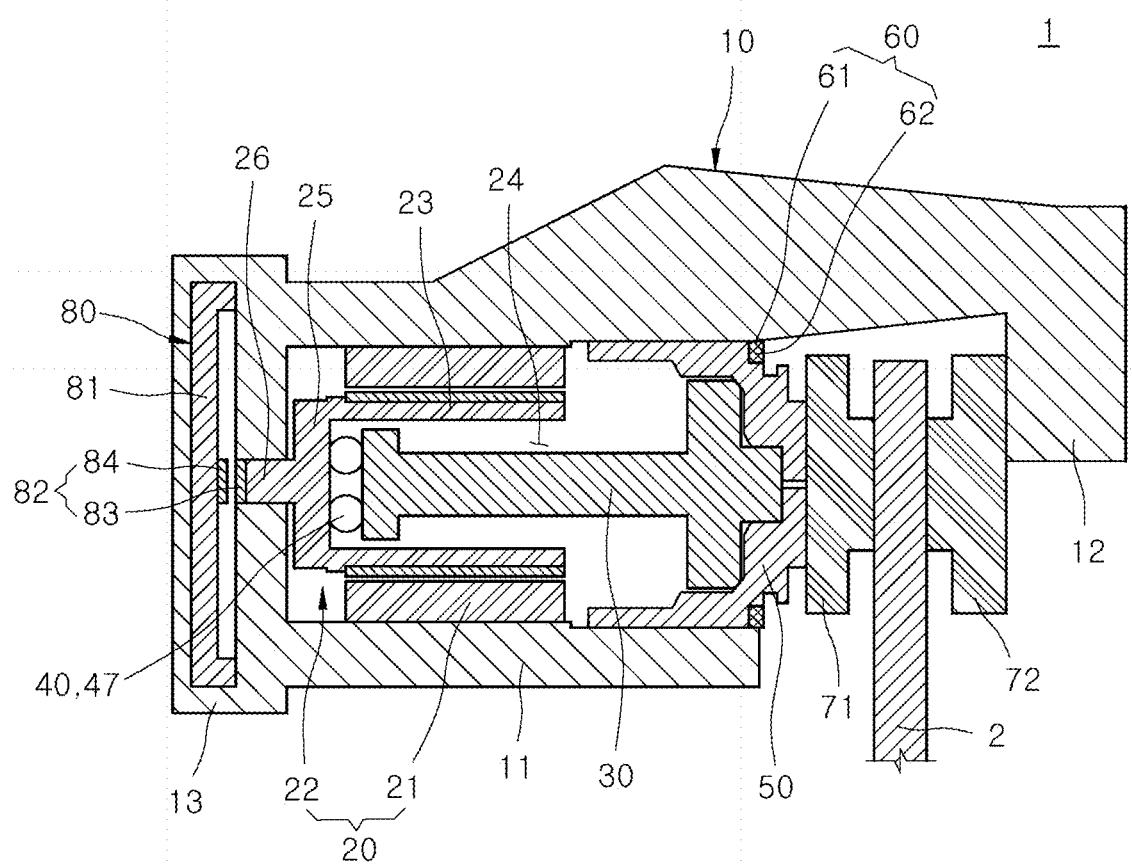
FIG. 4 is a conceptual view schematically illustrating an operating state of the electric brake apparatus of a vehicle in accordance with the embodiment of the present disclosure.
Figure 5:
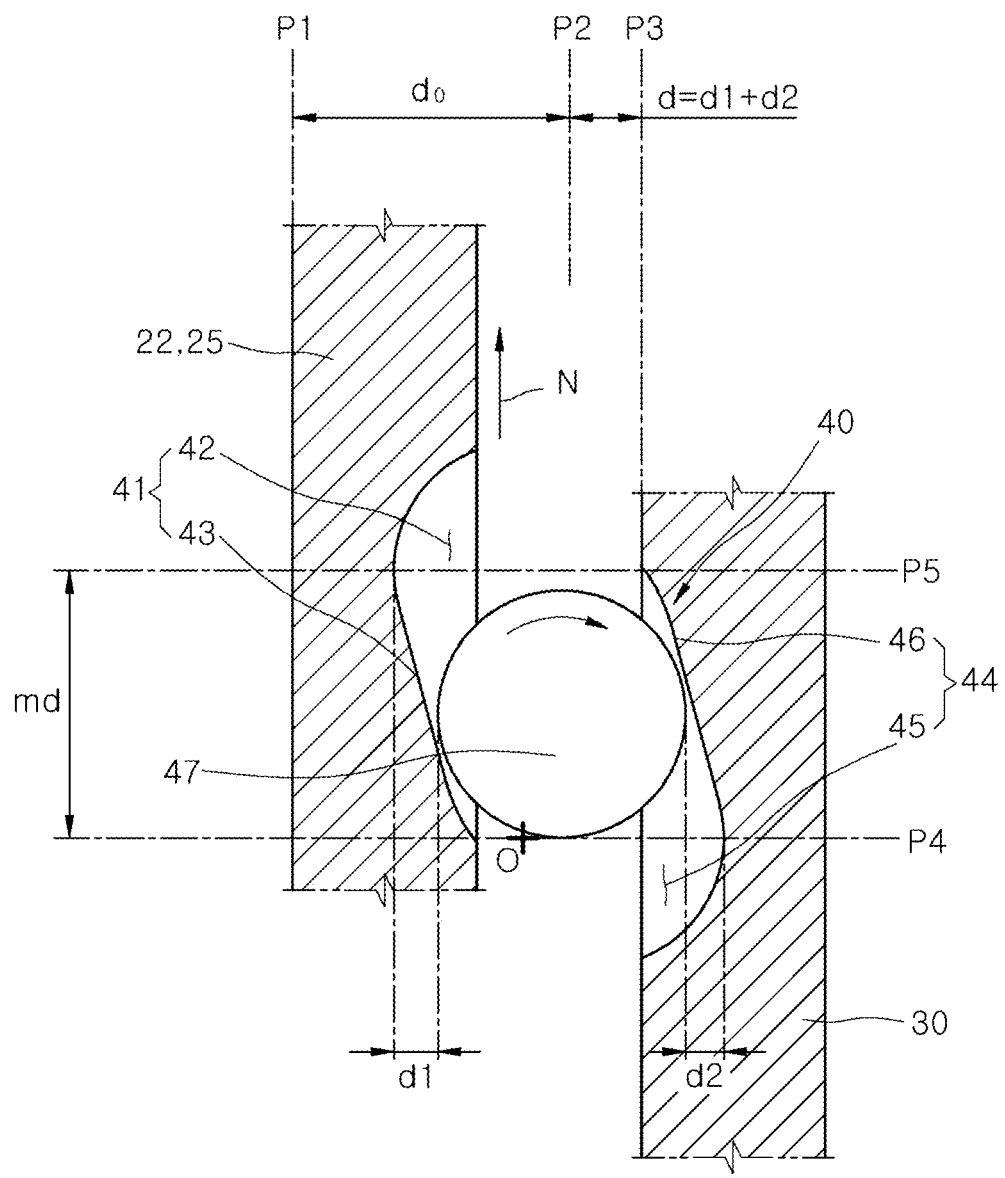
FIG. 5 is a conceptual view to assist in the explanation of an operating state of the ball-in-ramp in FIG. 4.

FIG. 4 is a conceptual view schematically illustrating an operating state of the electric brake apparatus of a vehicle in accordance with the embodiment of the present disclosure, and FIG. 5 is a conceptual view to assist in the explanation of an operating state of the ball-in-ramp in FIG. 4.

The pressing ball 47 has a spherical shape, and is disposed between the first ball-guide inclined section 41 and the second ball-guide inclined section 44. One part and the other part of the pressing ball 47 are in contact with the first ball-guide inclined section 41 and the second ball-guide inclined section 44, respectively. When the rotor section 22 is rotated in a forward direction (a direction indicated by an arrow N in FIG. 5), the pressing ball 47 presses the push rod 30 in the axial direction while rolling to a shallower position along the first circumferential inclined part 43 and the second circumferential inclined part 46 in conjunction with the rotation of the rotor section 22.

The pressing ball 47 has a first linear displacement 'd1' in the axial direction while being moved toward the other end of the first circumferential inclined part 43 along the first circumferential inclined part 43, and has a second linear displacement 'd2' in the axial direction while being moved toward the one end of the second circumferential inclined part 46 along the second circumferential inclined part 46. That is to say, when the rotor section 22 is rotated, the pressing ball 47 pushes the push rod 30 toward the piston 50 in the axial direction by the linear displacement 'd' corresponding to the sum of the first linear displacement 'd1' and the second linear displacement 'd2'.

The pressing ball 47 has the first linear displacement 'd1' in the axial direction while being moved toward the other end of the first circumferential inclined part 43 along the first circumferential inclined part 43, and additionally has the second linear displacement 'd2' in the axial direction while being moved toward the one end of the second circumferential inclined part 46 along the second circumferential inclined part 46.

In other words, when the rotor section 22 is rotated by a preset displacement 'md,' the pressing ball 47 has the linear displacement 'd' corresponding to the sum of the first linear displacement 'd1' and the second linear displacement 'd2' in the axial direction. Such a displacement of the pressing ball 47 induced by the rotation of the rotor section 22 is transferred to the push rod 30 which is in contact with the pressing ball 47, and the push rod 30 has an axis displacement corresponding to the linear displacement 'd'.

The piston 50 covers the open part of the cylinder section 11, is installed in the cylinder section 11 to be slidably movable, and is in contact with a right end of the push rod 30. When the rotor section 22 is rotated in the forward direction, the push rod 30 and the piston 50 are pushed together toward the brake disc 2 by the linear displacement 'd' of the pressing ball 47 that is converted as described above.

The boot seal 60, as a device unit which seals a gap between the cylinder section 11 and the piston 50 and at the same time elastically presses the piston 50 to allow the piston 50 to return to an initial position, has a ring shape corresponding to the inner diameter part of the cylinder section 11 and an outer diameter part of the piston 50. The boot seal 60 is made of an elastic material such as a rubber, is installed at an open end of the cylinder section 11, and has an inner diameter part which is in contact with the piston 50. The boot seal 60 in accordance with the embodiment of the present disclosure includes a cylinder installation section 61 and a piston pressing section 62.

The cylinder installation section 61, as a device section which forms an outer diameter part of the boot seal 60, is coupled to the inner diameter part of the cylinder section 11. A groove (not illustrated) into which the cylinder installation section 61 may be fitted may be formed in the inner diameter part of the cylinder section 11, and the cylinder installation section 61 may be fixedly installed at a predetermined position by being closely fitted into the groove formed in the inner diameter part of the cylinder section 11.

The piston pressing section 62, as a device section which forms the inner diameter part of the boot seal 60, is positioned to project into the cylinder section 11, and is in elastic contact with a right part of the piston 50. The piston pressing section 62 closes a gap between the cylinder section 11 and the piston 50, thereby preventing deterioration in operability due to insertion or pinching of foreign substances.

The piston pressing section 62 elastically presses the piston 50 toward a left side where the push rod 30 is positioned, such that the piston 50 and the push rod 30 may return to an initial position as illustrated in FIG. 1 when the rotor section 22 is rotated in a reverse direction in a state in which the piston 50 is moved to a brake operating position as illustrated in FIG. 4.

The first friction pad 71 is coupled to a right end of the piston 50. The second friction pad 72 is coupled to the boost force support section 12 which is disposed on a right side of the piston 50 to face the piston 50. The first friction pad 71 and the second friction pad 72 are disposed on both sides, that is, a left side and a right side, of the brake disc 2, respectively, with the brake disc 2 interposed therebetween.

When the rotor section 22 is rotated in the forward direction, the piston 50 is moved toward the brake disc 2 as illustrated in FIG. 4 by the operation of the ball-in-ramp 40 as illustrated in FIG. 5, and, as the first friction pad 71 and the second friction pad 72 are sequentially brought into contact with the brake disc 2, the rotation of the brake disc 2 is restrained. According to the present disclosure, wheel braking is realized by such an operation.

The electronic control unit 80 includes a sensor 82 which senses a rotational displacement of the internal motor 20, thereby controlling the driving of the internal motor 20. As the electronic control unit 80, an electronic control unit (ECU) which generates a control signal for adjusting a braking pressure of a vehicle, that is, for controlling the driving of the internal motor 20, may be applied. Referring to FIG. 1, the electronic control unit 80 in accordance with the embodiment of the present disclosure includes a circuit board 81 and the sensor 82.

The circuit board 81, as a device section which constitutes a main body of the electronic control unit 80, has a circuit structure capable of controlling the driving of the internal motor 20, and is installed inside the control unit installation section 13. The sensor 82 senses a rotational displacement of the internal motor 20, and outputs the sensed rotational displacement to the circuit board 81. The sensor 82 in accordance with the embodiment of the present disclosure includes a magnet part 83 and a magnet sensing part 84.

The rotation shaft part 26 is fitted, from a left side, into the hole which is formed in the cylinder section 11 to pass through the torque transfer part 25 in the axial direction, and is rotatably installed through a closed end of the cylinder section 11. The closed end of the cylinder section 11 corresponds to the left end of the cylinder section 11 in FIG. 1, and is an expression for comparison with the right end of the cylinder section 11 which is the open part of the cylinder section 11. The left end of the rotation shaft part 26 is exposed to the space inside the control unit installation section 13 which is positioned on a left side of the cylinder section 11, through the hole which is formed in the closed end of the cylinder section 11 to pass therethrough in the axial direction.

The magnet part 83 includes a permanent magnet, and is coupled to the left end of the rotation shaft part 26. The magnet part 83 is coupled to the left end of the rotation shaft part 26 which is exposed to the space inside the control unit installation section 13, and is disposed to face the circuit board 81.

The magnet sensing part 84 senses a change in an electromagnetic field formed between the magnet part 83 and the magnet sensing part 84 when the rotor section 22 is rotated, and outputs the sensed change to the circuit board 81. The magnet sensing part 84 is disposed on the circuit board 81 installed in the control unit installation section 13, to face the magnet part 83. The magnet sensing part 84 may continuously sense a magnetic force of the magnet part 83 or a change in a magnetic field due to movement of the magnet part 83, through the hole formed in the cylinder section 11.

By directly connecting and installing the magnet sensing part 84 to the circuit board 81 being a target to which a signal is to be outputted, signal transmissibility may be stably secured, and a separate space or component for transmitting a sensing signal of the magnet sensing part 84 to the circuit board 81 may be omitted.

By the electric brake apparatus 1 of a vehicle according to the embodiment of the present disclosure, having the construction described above, it is possible to realize a boost force generation and transfer structure in which the internal motor 20 generating a rotational displacement, the ball-in-ramp 40 converting the rotational displacement of the internal motor 20 into a linear displacement and the push rod 30 pushing the piston 50 are axially and radially disposed in the cylinder section 11 of the caliper body 10.

Therefore, according to the embodiment of the present disclosure, when compared to the conventional art in which casings for respectively accommodating an actuator (not illustrated) generating a rotational force, a gear device (not illustrated) for decelerating the output of the actuator and a screw device (not illustrated) converting the rotational displacement of the gear device into a linear displacement should be separately provided, the caliper body 10 may perform a function that substantially incorporates the functions of the casing of the actuator and the casing of the gear device.

Also, according to the embodiment of the present disclosure, the conventional complex structure including a bolt screw (not illustrated) and a nut screw (not illustrated) may be avoided by simplifying and applying the conventional complex structure as a component corresponding to the push rod 30 which has only a linear displacement.

Consequently, according to the embodiment of the present disclosure, it is possible to not only realize miniaturization and weight reduction, by simplification of a structure, but also achieve ease of manufacture and cost reduction.

Although the present disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the present disclosure as defined in the accompanying claims. Thus, the true technical scope of the present disclosure should be defined by the following claims.

What is claimed is:

1. An electric brake apparatus of a vehicle, comprising:
    a caliper body formed with a cylinder section and a boost force support section which is disposed to face the cylinder section with a brake disc interposed therebetween;
    an internal motor installed in the cylinder section, and generating a rotational displacement by application of current;
    a push rod disposed coaxially with the internal motor;
    a ball-in-ramp disposed between the internal motor and the push rod, converting the rotation displacement of the internal motor into a linear displacement, and transferring the linear displacement to the push rod;
    a piston pushed and moved by the push rod;
    a first friction pad coupled to the piston, and disposed on one side of the brake disc; and
    a second friction pad coupled to the boost force support section, and disposed on the other side of the brake disc,
    wherein the internal motor comprises:
    a stator section fixedly installed to the cylinder section; and a rotor section rotatably installed to the cylinder section, facing the push rod with the ball-in-ramp interposed therebetween, and rotated by an electromagnetic field formed between the rotor section and the stator section,
    wherein the rotor section comprises:
    a rotor body part having a cylindrical shape, and disposed radially inward of the stator section;
    a rotor open part formed to be open at one end of the rotor body part, and forming a passage through which the push rod is introduced into the rotor body part;
    a torque transfer part, which is an integrally formed with the rotor body part, formed to close the other end of the rotor body part, and facing the push rod with the ball-in-ramp interposed therebetween; and
    a rotation shaft part formed at a rotational center portion of the torque transfer part, and rotatably installed to the cylinder section.

2. The electric brake apparatus of the vehicle of claim 1, wherein the ball-in-ramp comprises:
    one or more first ball-guide inclined sections formed in one of the rotor section and the push rod;
    one or more second ball-guide inclined sections formed in the other of the rotor section and the push rod, and disposed to face the one or more first ball-guide inclined sections; and
    one or more pressing balls disposed between the one or more first ball-guide inclined sections and the one or more second ball-guide inclined sections, and pressing the push rod in an axial direction while rolling in conjunction with rotation of the rotor section.

3. The electric brake apparatus of the vehicle of claim 2, wherein the one or more first ball-guide inclined sections comprise:

one or more first ball-guide groove parts formed to be recessed in a circular or arc shape at one side of the rotor section which faces the push rod, and having one part of the one or more pressing balls introduced therein; and one or more first circumferential inclined parts forming an inclined surface which continues in an extending direction of the one or more first ball-guide groove parts, to allow the one or more pressing balls to have an axial displacement while being moved along the one or more first ball-guide groove parts.

4. The electric brake apparatus of the vehicle of claim 3, wherein the one or more second ball-guide inclined section comprise:

one or more second ball-guide groove parts formed to be recessed in a circular or arc shape at one side of the push rod which faces the rotor section, and having the other part of the one or more pressing balls introduced therein; and one or more second circumferential inclined parts forming an inclined surface which continues in an extending direction of the one or more second ball-guide groove parts, to allow the one or more pressing balls to have an axial displacement while being moved along the one or more second ball-guide groove parts.

5. The electric brake apparatus of the vehicle of claim 4, wherein the push rod has a linear displacement corresponding to a sum of a first linear displacement in the axial direction while the one or more pressing balls is moved along the one or more first circumferential inclined parts when the rotor section is rotated and a second linear displacement in the axial direction while the one or more pressing balls are moved along the one or more second circumferential inclined parts when the rotor section is rotated.

6. The electric brake apparatus of the vehicle of claim 1, further comprising:

a boot seal made of an elastic material, installed in the cylinder section, and having an inner diameter part which is in contact with the piston.

7. The electric brake apparatus of the vehicle of claim 6, wherein the boot seal comprises:

a cylinder installation section coupled to the cylinder section; and a piston pressing section formed to project into the cylinder section, being in contact with the piston, and elastically pressing the piston toward the push rod.

8. The electric brake apparatus of the vehicle of claim 1, further comprising:

an electronic control unit including a sensor which senses the rotational displacement of the internal motor, and controlling driving of the internal motor.

9. The electric brake apparatus of the vehicle of claim 8, wherein the sensor comprises:

a magnet part including a permanent magnet, and coupled to the internal motor; and a magnet sensing part installed on a circuit board of the electronic control unit, and sensing a change in an electromagnetic field formed between the magnet part and the magnet sensing part when the internal motor is rotated.

10. The electric brake apparatus of the vehicle of claim 8, wherein the caliper body further comprises:

a control unit installation section disposed to be aligned with the cylinder section in an axial direction, and having the electronic control unit accommodated therein.

11. The electric brake apparatus of the vehicle of claim 1, wherein the ball-in-ramp is disposed between an interior surface of the torque transfer part and a farthest portion of the push rod from a portion of the push rod pushing the piston.

* * * * *